(12) United States Patent
Lee et al.

(10) Patent No.: US 8,656,376 B2
(45) Date of Patent: Feb. 18, 2014

(54) COMPILER FOR PROVIDING INTRINSIC SUPPORTS FOR VLIW PAC PROCESSORS WITH DISTRIBUTED REGISTER FILES AND METHOD THEREOF

(75) Inventors: Jenq Kuen Lee, Hsinchu (TW); Chi Bang Kuan, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 224 days.

(21) Appl. No.: 13/223,489

(22) Filed: Sep. 1, 2011

(65) Prior Publication Data
US 2013/0061022 A1    Mar. 7, 2013

(51) Int. Cl.
*G06F 15/00*   (2006.01)
*G06F 15/76*   (2006.01)
*G06F 9/30*    (2006.01)
*G06F 9/40*    (2006.01)
*G06F 9/44*    (2006.01)
*G06F 9/45*    (2006.01)

(52) U.S. Cl.
USPC ............... 717/149; 712/20; 712/22; 712/41; 712/208; 717/106; 717/124; 717/140; 717/142; 717/146; 717/151; 717/152; 717/155; 718/101

(58) Field of Classification Search
None
See application file for complete search history.

(56) References Cited

U.S. PATENT DOCUMENTS

| | | | |
|---|---|---|---|
| 7,284,241 B2 * | 10/2007 | Heishi et al. ................. | 717/152 |
| 7,831,804 B2 * | 11/2010 | Pappalardo et al. ............ | 712/20 |
| 8,006,204 B2 * | 8/2011 | Killian et al. ................. | 717/124 |
| 8,151,254 B2 * | 4/2012 | Heishi et al. ................. | 717/151 |
| 2001/0052063 A1 * | 12/2001 | Tremblay et al. ............. | 712/208 |
| 2005/0071825 A1 * | 3/2005 | Nagaraj et al. ................ | 717/142 |
| 2006/0200796 A1 * | 9/2006 | Ota et al. ...................... | 717/106 |
| 2009/0043620 A1 * | 2/2009 | Lee et al. ...................... | 705/7 |
| 2009/0070552 A1 * | 3/2009 | Kanstein et al. .............. | 717/140 |
| 2009/0228874 A1 * | 9/2009 | Lambrechts et al. ......... | 717/146 |
| 2010/0186006 A1 * | 7/2010 | Bougard et al. .............. | 717/155 |
| 2011/0029756 A1 * | 2/2011 | Biscondi et al. .............. | 712/22 |
| 2011/0055836 A1 * | 3/2011 | Raghavan et al. ............ | 718/101 |
| 2012/0131309 A1 * | 5/2012 | Johnson et al. ............... | 712/41 |

OTHER PUBLICATIONS

Andrei Sergeevich Terechko, Clustered VLIW Architectures: a Quantitative Approach , Feb. 2007, [Retrieved on Jul. 31, 2012]. Retrieved from the internet: <URL: http://alexandria.tue.nl/extra2/200612403.pdf> 175 pp. 1-165.*

Rainer Leupers.,Instruction Scheduling for Clustered VLIW DSPs, 2000 IEEE, 0-7695-0622-4/00 [Retrieved on Nov. 19, 2013]. Retrieved from the internet: <URL: http://ieeexplore.ieee.org/stamp/stamp.jsp?tp=&arnumber=888353> 10 Pages (291-300).*

Yung-Chia Lin et al.,Register Allocation for VLIW DSP Processors with Irregular Register Files, 2006, [Retrieved on Nov. 19, 2013]. Retrieved from the internet: <URL: http://sslab.cs.nctu.edu.tw/publications/cpc2006.pdf> 15 pp. 1-15.*

* cited by examiner

*Primary Examiner* — Don Wong
*Assistant Examiner* — Anibal Rivera
(74) *Attorney, Agent, or Firm* — WPAT, P.C.; Anthony King; Kay Yang (57) ABSTRACT

A method for providing intrinsic supports for a VLIW DSP processor with distributed register files comprises the steps of: generating a program representation with cluster information on instructions of the DSP processor, wherein the cluster information is provided by a program with cluster intrinsic coding; identifying data stream operations indicating parallel instruction sequences applied on different data sets in the program representation; identifying data sharing relations indicating data shared by the data stream operations in the program representation; identifying data aggregation relations indicating results aggregated from the data stream operations in the program representation; and performing register allocation for the DSP processor according to the identified data stream operations, the data sharing relations and the data aggregation relations.

16 Claims, 6 Drawing Sheets

```
1   short __attribute__ ((aligned(4))) H[N];
2   short __attribute__ ((aligned(4))) X[N];
3   int *vX = (int *)X, *vH = (int *)H;
4   int v_err=0, sum1=0, sum2=0, sum3=0, sum4=0;
5
6   for(f=1, X[-1] = x; f < (N/2)+1; f+=4)
7   {
8       vX[(N/2)-f] = __builtin_c1_permh2(vX[(N/2)-f-1], vX[(N/2)-f], 1, 2);
9       sum1 = __builtin_c1_mac_d(sum1, vH[(N/2)-f], vX[(N/2)-f]);
10      vX[(N/2)-f-1] = __builtin_c1_permh2(vX[(N/2)-f-2], vX[(N/2)-f-1], 1, 2);
11      sum2 = __builtin_c1_mac_d(sum2, vH[(N/2)-f-1], vX[(N/2)-f-1]);
12
13      vX[(N/2)-f-2] = __builtin_c2_permh2(vX[(N/2)-f-3], vX[(N/2)-f-2], 1, 2);
14      sum3 = __builtin_c2_mac_d(sum3, vH[(N/2)-f-2], vX[(N/2)-f-2]);
15      vX[(N/2)-f-3] = __builtin_c2_permh2(vX[(N/2)-f-4], vX[(N/2)-f-3], 1, 2);
16      sum4 = __builtin_c2_mac_d(sum4, vH[(N/2)-f-3], vX[(N/2)-f-3]);
17  }
18  y = __builtin_c1_mergea(__builtin_c1_add_d(sum1, sum2)) +
19      __builtin_c2_mergea(__builtin_c2_add_d(sum3, sum4));
20
21  error = (d - y) * delta;
22  v_err = __builtin_permh2(error, error, 0, 0);
23  for (f = 0; f < (N/2); f+=2)
24  {
25      vH[f] = __builtin_c1_mac_d(vH[f], vX[f], v_err);
26      vH[f+1] = __builtin_c2_mac_d(vH[f+1], vX[f+1], v_err);
27  }
```

COMPILER FOR PROVIDING INTRINSIC SUPPORTS FOR VLIW PAC PROCESSORS WITH DISTRIBUTED REGISTER FILES AND METHOD THEREOF

BACKGROUND OF THE INVENTION

1. Technical Field

The present invention relates to a compiling method, and more particularly, to a method for providing intrinsic supports for a digital signal processing (DSP) processor with very long instruction word (VLIW) architectures and distributed register files.

2. Background

To handle increasing multimedia workloads, single-instruction-multiple-data (SIMD) computing is generally realized in most modern processors as multimedia extensions. Recently, these multimedia extensions are able to manipulate multiple data in 128-bit or 256-bit vector registers. Similarly, digital signal processing (DSP) processors with very long-instruction-word (VLIW) architectures are often equipped with sub-word instructions to accelerate sub-word data processing. Although the vector widths of VLIW DSP processors, which are usually 32-bit, are relatively short compared to those of general purpose processors, they are sufficient for image and audio/video processing in embedded systems. In addition to sub-word instructions, functional units of VLIW DSP processors can also be utilized to process multiple data streams in parallel. For instance, a five-way issue VLIW DSP processor with two multiplication units can issue up to two multiplications or five normal operations per cycle. This SIMD capability by parallel instruction issuing can be extended by increasing the number of functional units. However, the nature of centralized register files makes it difficult to add unlimited functional units because of increasing silicon areas and power consumption for wire connection between register files and functional units. Therefore, many embedded VLIW DSP processors adopt distributed register files (DRF) to reduce wire connections by clustering functional units and privatizing register files for clusters and even for functional units.

Figure 1:
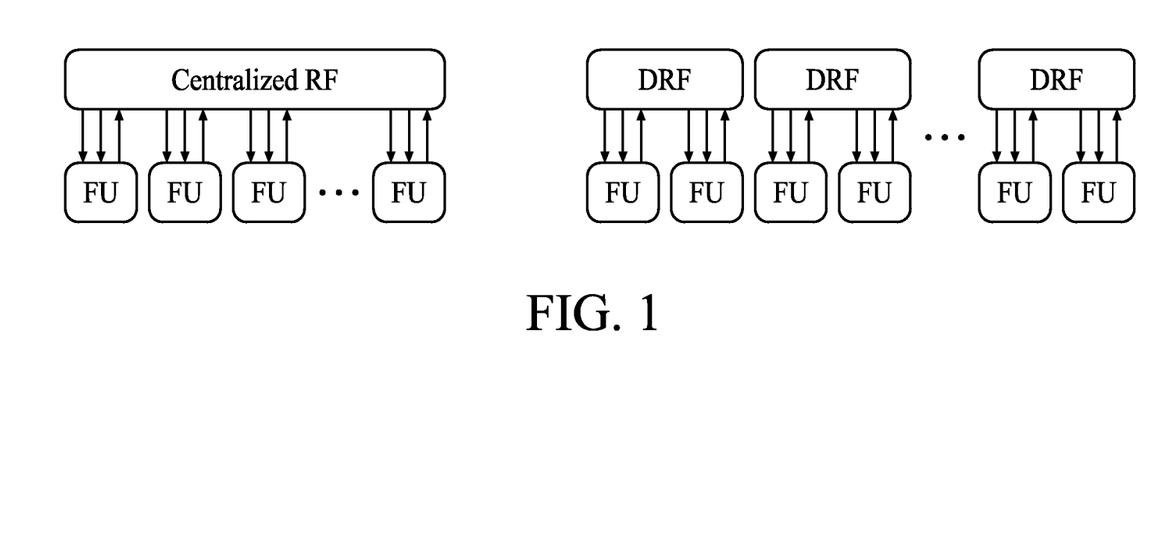
FIG. 1 shows schematic views of a VLIW DSP processor with centralized register files and distributed register files.

FIG. 1 shows schematic views of a VLIW DSP processor with centralized register files in the left side and a VLIW DSP processor with distributed register files on the right side. As shown in FIG. 1, although the DRF design contributes to scalability, it sacrifices programmability and performance because of the reduced data (or register) accessibility. In addition, with the DRF design, data accessing is a critical concern, where data sharing between functional units may incur communication overhead from one to multiple cycles. Accordingly, it is difficult for compilers to employ functional units for parallel data stream processing. Therefore, there is a need to design a compiler that supports and recognizes intrinsic information in a user-provided program.

SUMMARY

The VLIW DSP processor with distributed register files according to one embodiment of the present invention comprises a plurality of clusters. Each cluster comprises a plurality of functional units, a plurality of local register files connected to one of the plurality of functional units, and at least one global register file. Each of the at least one global register files is comprised of a plurality of global banks connected to one of the plurality of functional units.

The method for providing intrinsic supports for a VLIW DSP processor with distributed register files according to one embodiment of the present invention comprises the steps of: generating a program representation with cluster information on instructions of the DSP processor, wherein the cluster information is provided by a program with cluster intrinsic coding; identifying data stream operations indicating parallel instruction sequences applied to different data sets in the program representation; identifying data sharing relations indicating data shared by the data stream operations in the program representation; identifying data aggregation relations indicating results aggregated from the data stream operations in the program representation; and performing register allocation for the DSP processor according to the identified data stream operations, the data sharing relations and the data aggregation relations.

The compiler for providing intrinsic supports for a VLIW DSP processor with distributed register files according to one embodiment of the present invention, when executed, is configured to perform the steps of: generating a program representation with cluster information on instructions of the DSP processor, wherein the cluster information is provided by a program cluster intrinsic coding; identifying data stream operations indicating parallel instruction sequences applied to different data sets in the program representation; identifying data sharing relations indicating data shared by the data stream operations in the program representation; identifying data aggregation relations indicating results aggregated from the data stream operations in the program representation; and performing register allocation for the DSP processor according to the identified data stream operations, the data sharing relations and the data aggregation relations.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes as those of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention will become apparent upon reading the following description and upon referring to the accompanying drawings of which.

DETAILED DESCRIPTION

Figure 2:
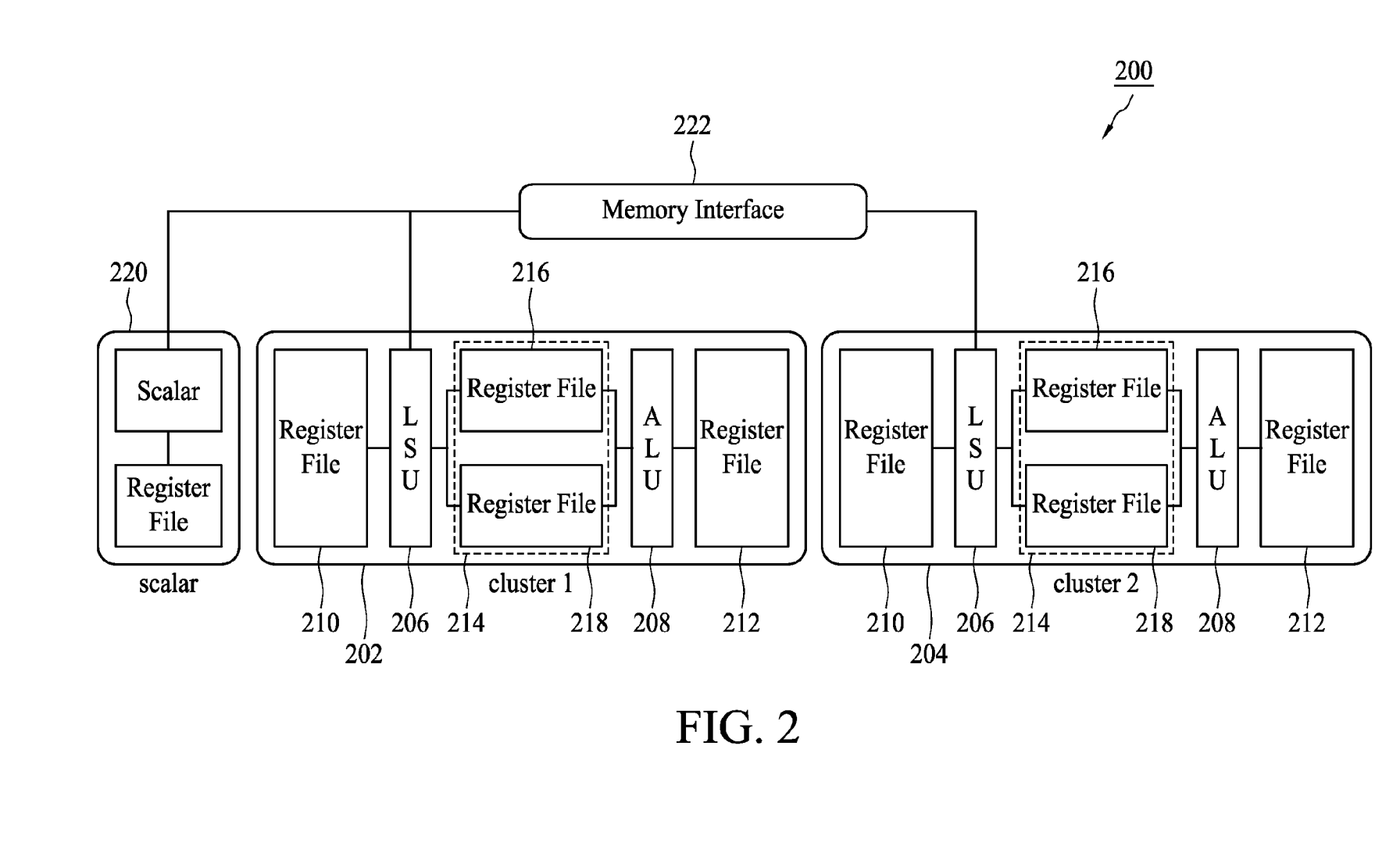
FIG. 2 shows the architecture overview of a VLIW DSP processor according to an embodiment of the present invention.

FIG. 2 shows the architecture overview of a VLIW DSP processor according to an embodiment of the present invention. The processor 200 shown in FIG. 2 is a 32-bit five-way issue VLIW DSP processor that comprises two clusters 202 and 204. Each cluster comprises a load/store unit (LSU) 206, an arithmetic logic unit (ALU) 208, two local register files 210 and 212, and a global register file 214 comprising two global banks 216 and 218. In addition, the processor 200 also comprises a scalar unit 220 connected between the clusters 202 and 204. The load/store units 206 are in charge of memory accessing and inter-cluster communication via a memory interface 222. The arithmetic logic units 208 are capable of multiplication and saturation operations. The scalar unit 220 manages program control by issuing conditional branch instructions. As can be seen in FIG. 2, there are no shared register files for functional units in different clusters. Data shared by functional units of different clusters have to be transmitted between clusters through communication issued by the load/store units 206. Meanwhile, in both clusters 202 and 204, each of the functional units 206 and 208 has an access to its own local register file 210 and 212, respectively. Data stored in these local register files 210 and 212 cannot be accessed by other functional units even if they are in the same cluster. Further, data shared by functional units within a cluster have to reside at global register files 214 to be accessible. To reduce wire connection, each global register file is divided into two global banks. Access to these banks is restricted, forbidding multiple functional units reading from and writing to a bank simultaneously. That is, each bank only provides exclusive read and exclusive write in one operation cycle. If more than one functional unit attempts to read or write data from or to a bank, a global bank contention will occur and it will cause errors in instruction encoding.

To fully utilize the architecture behavior and meet the constraint of the processor 200 shown in FIG. 2, the embodiments of the present invention provide a compiler and the method thereof that supports and recognizes intrinsic information in a user-provided program.

Figure 3:
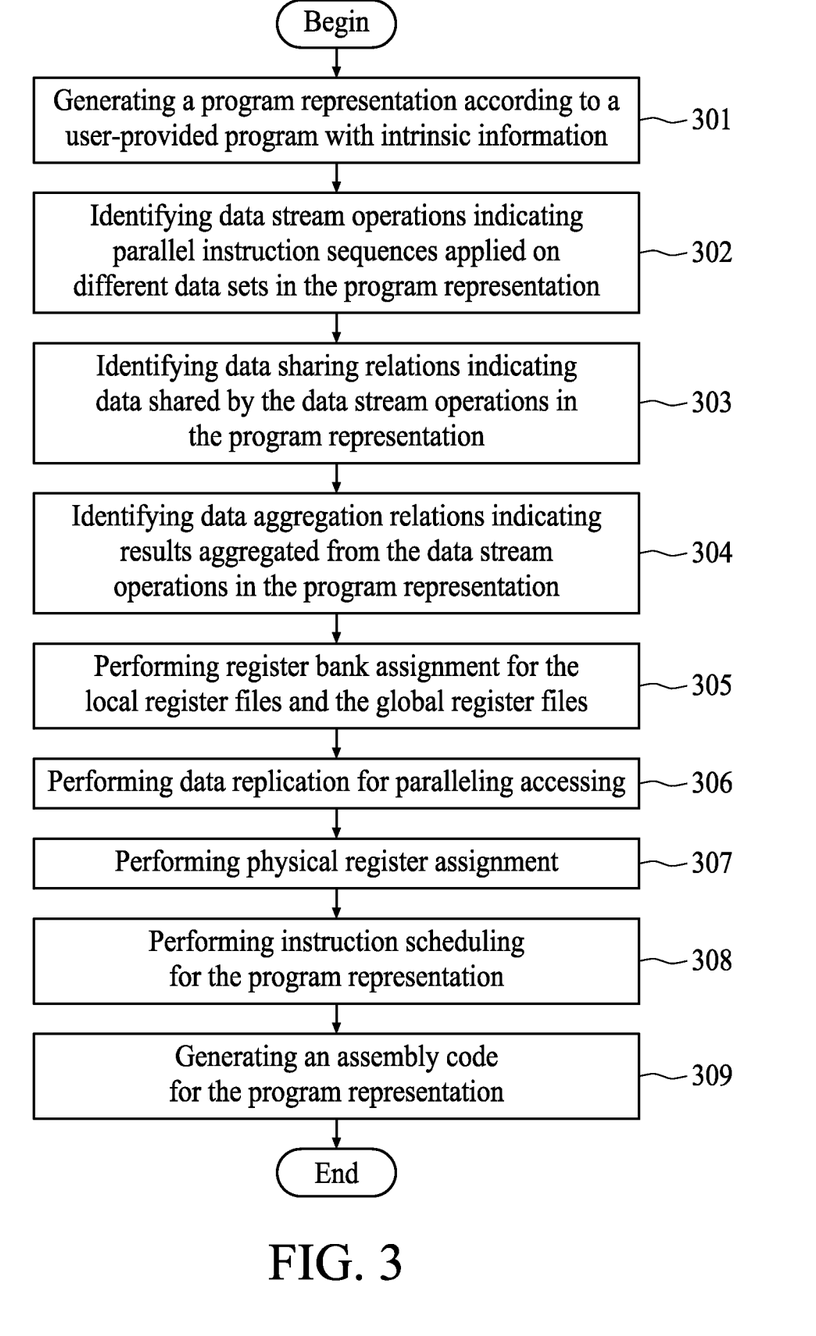
FIG. 3 shows the flowchart of the method for providing intrinsic supports for a VLIW DSP processor with distributed register files according to an embodiment of the present invention.

FIG. 3 shows the flowchart of the method for providing intrinsic supports for a VLIW DSP processor with distributed register files according to an embodiment of the present invention. In step 301, a program representation is generated according to a user-provided program with intrinsic information, and step 302 is executed, wherein the intrinsic information including sub-word intrinsic information indicating instructions supported by the DSP processor 200, and cluster intrinsic information indicating a corresponding relation between an instruction and the cluster executing the instruction. In step 302, data stream operations indicating parallel instruction sequences applied on different data sets in the program representation are identified, and step 303 is executed. In step 303, data sharing relations indicating data shared by the data stream operations in the program representation are identified, and step 304 is executed. In step 304, data aggregation relations indicating results aggregated from the data stream operations in the program representation are identified, and step 305 is executed. In step 305, register bank assignment for the local register files and the global register files is performed, and step 306 is executed. In step 306, data replication for parallel accessing is performed, and step 307 is executed. In step 307, physical register assignment is performed, and step 308 is executed. In step 308, instruction scheduling for the program representation is performed, and step 309 is executed. In step 309, an assembly code for the program representation is generated according to the result of the instruction scheduling step.

Figure 4:
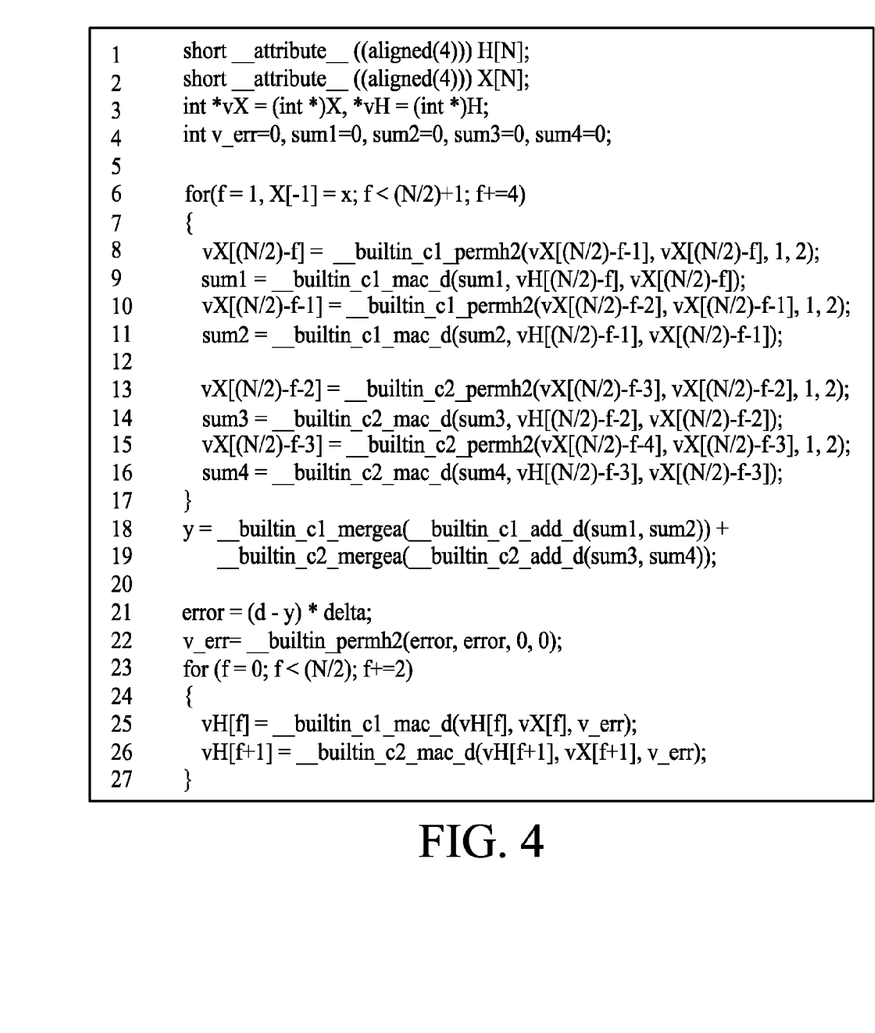
FIG. 4 shows a fragment of a C program according to an embodiment of the present invention.

FIG. 4 shows a fragment of a C program according to an embodiment of the present invention. In this embodiment, the compiler comprises a function bank including functions supporting sub-word intrinsic coding and cluster intrinsic coding, such as the function _builtin_c1_add_d(int, int) shown in FIG. 4. For sub-word intrinsic information, the compiler of this embodiment comprises functions such as int_builtin_add_d(int, int) and int_builtin_add_q(int, int), wherein the former corresponds to the half-word sub-word instruction supported by the DSP processor 200, and the latter corresponds to the quarter-word sub-word instruction supported by the DSP processor 200. For cluster intrinsic information, the compiler of this embodiment comprises functions such as int_builtin_c1_add(int, int) and int_builtin_c2_add(int, int), wherein the former is dedicated to the cluster 202 of the DSP processor 200, and the latter is dedicated to the cluster 204 of the DSP processor 200.

Figure 5:
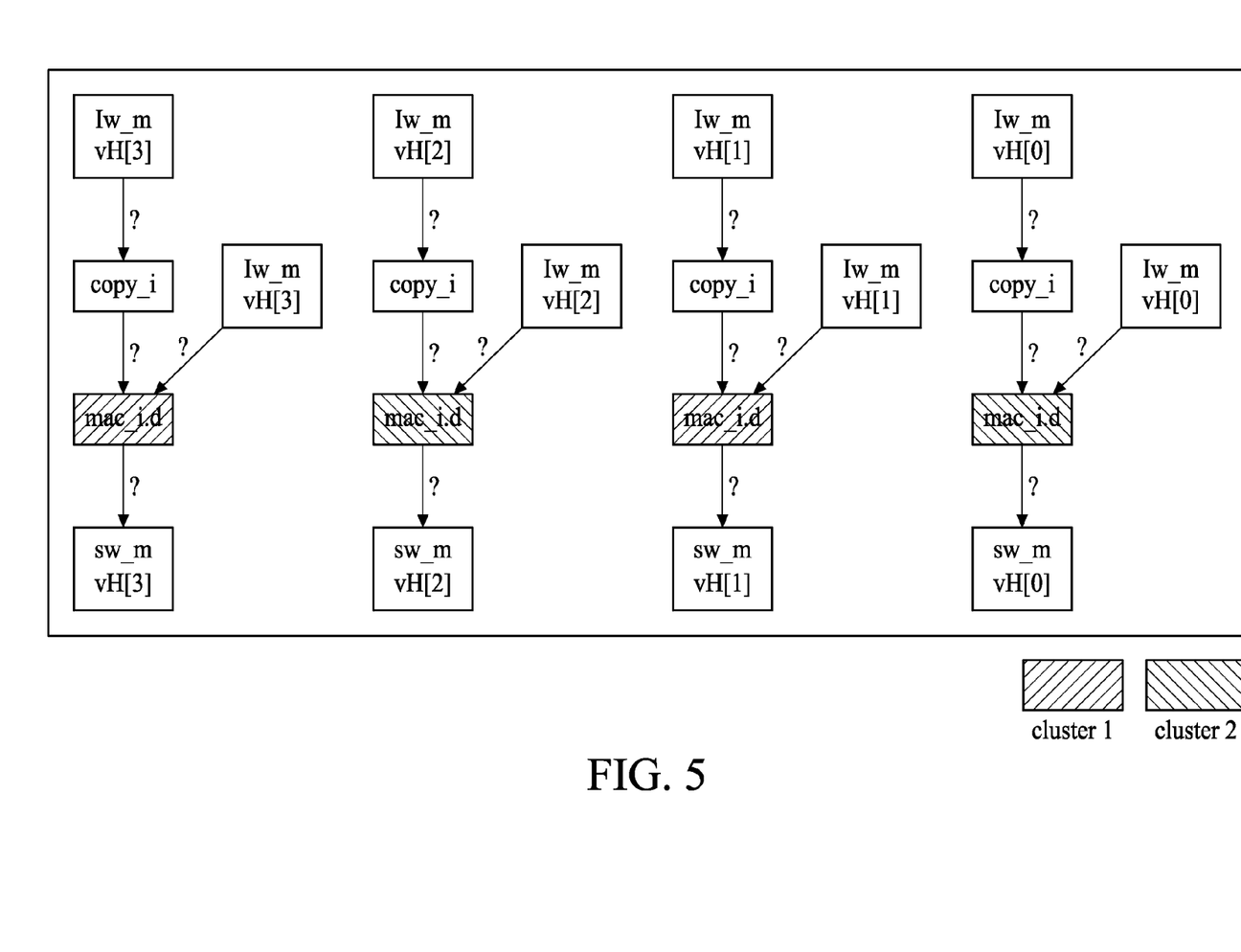
FIG. 5 shows a program representation according to an embodiment of the present invention.

Accordingly, by applying the method shown in FIG. 3 to the C program shown in FIG. 4, in step 301, a program representation is generated. FIG. 5 shows an example of a program representation. As can be seen in FIG. 5, some instructions, represented by nodes, have been assigned to the clusters 204 and 206, and the other instructions have not yet been assigned to any cluster. In addition, the edges connecting the instruction nodes, which represent data, as marked in question marks, have not yet been assigned to any register files either. In steps 302 to 304, the compiler recognizes key SIMD components in the program representation. In step 302, the SIMD components of data stream operations are identified, wherein the data stream operations are sets of resembling and independent instruction sequences. For instance, the four separate instruction trees shown in FIG. 5 are as four data stream operations. In step 303, the SIMD components of data sharing relations are identified, wherein the data sharing relations are data shared by multiple data stream operations. In step 304, the SIMD components of data aggregation relations are identified, wherein the data aggregation relations are results to be merged from data stream operations. After the identification of these key SIMD components in the program representation, the register allocation for the DSP processor 300 can be performed according to the identified data stream operations, the data sharing relations and the data aggregation relations.

Figure 6:
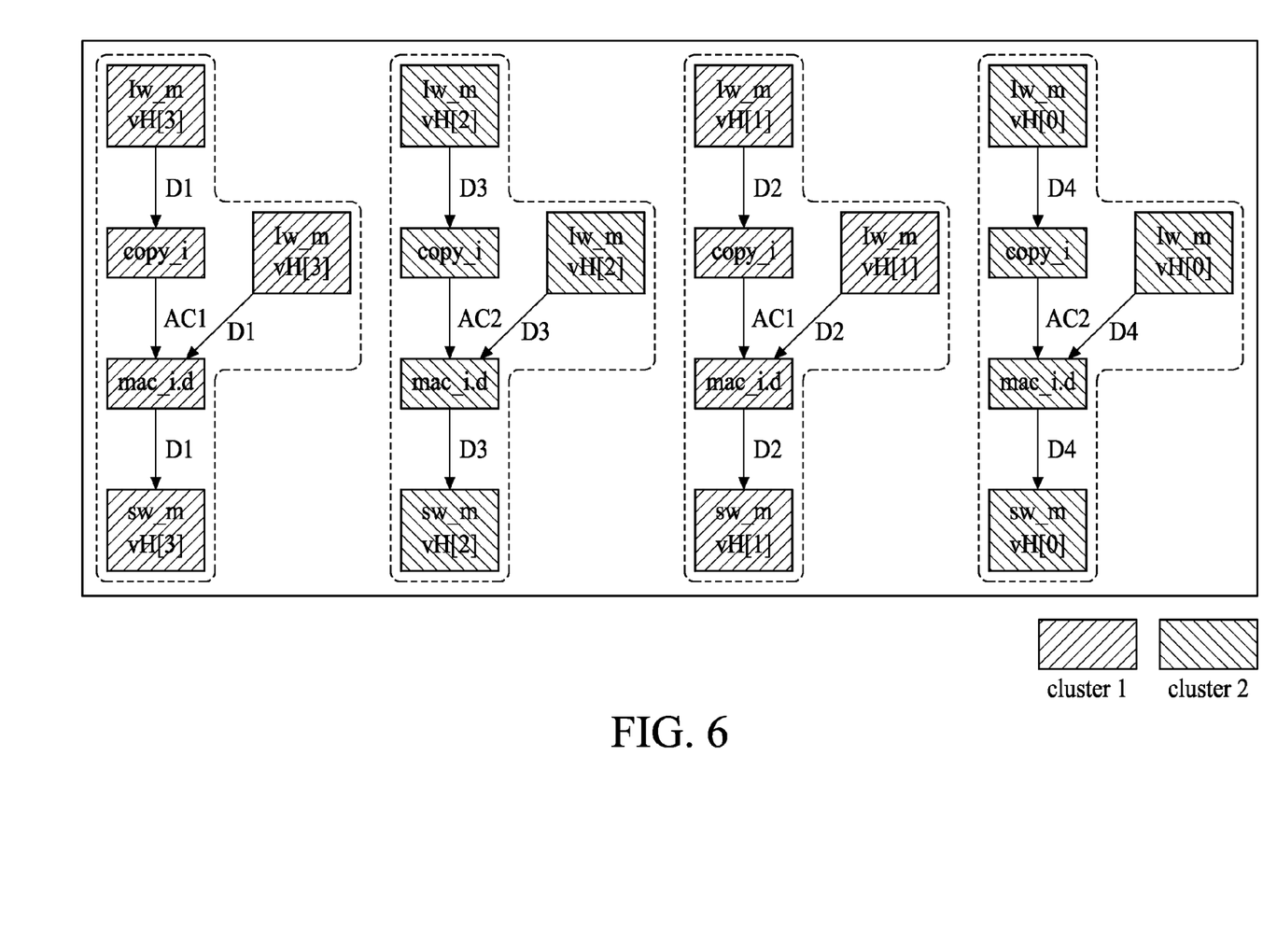
FIG. 6 shows another program representation according to an embodiment of the present invention.

In step 305, register bank assignment for the local register files and the global register files is performed. In this embodiment, step 305 is executed as follows. First, a datum is allocated to one local register file if that datum is only accessed by one functional unit. Second, a dedicated global bank is provided to each identified data stream operation, and a datum is allocated to a global bank if it is accessed by more than one functional unit, wherein the global bank corresponds to the data stream operation to which the allocated datum belongs. FIG. 6 shows the result after the step of register bank assignment. As can be seen in FIG. 6, all of the instructions are assigned to either the cluster 204 or the cluster 206, and all of the data are assigned to register files, wherein D1 to D4 represent the register files 216 and 218 of the clusters 202 and 204 respectively, and AC1 and AC2 represent the register files 212 of the clusters 202 and 204 respectively.

In step 306, data replication for paralleling accessing is performed. In this embodiment, step 306 is executed as follows. A datum in a data sharing relation is replicated from one global bank to another global bank by duplicating instructions if the result of the register bank assignment directs the datum to be at multiple banks. After the step of data replication, steps 307 to 309 are executed in order such that an assembly code is produced.

In conclusion, the present invention provides a compiler and a method thereof that provides intrinsic support for VLIW DSP processors with distributed register files. Accordingly, the compiling of the user-provided programs for the VLIW DSP processors with distributed register files can be performed more efficiently.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing intrinsic supports for a digital signal processing (DSP) processor with very long instruction word (VLIW) architectures and distributed register files, the DSP processor comprising a plurality of clusters, each cluster comprising a plurality of functional units, a plurality of local register files connected to one of the plurality of functional units, and at least one global register file, each of the at least one global register files comprising a plurality of global banks connected to one of the plurality of functional units, the method comprising the steps of:
   generating a program representation with cluster information on instructions of the DSP processor, wherein the cluster information is provided by a program with cluster intrinsic coding;
   identifying data stream operations indicating parallel instruction sequences applied on different data sets in the program representation;
   identifying data sharing relations indicating data shared by the data stream operations in the program representation;
   identifying data aggregation relations indicating results aggregated from the data stream operations in the program representation; and
   performing register allocation for the DSP processor according to the identified data stream operations, the data sharing relations and the data aggregation relations,
   wherein the step of performing register allocation comprises a sub-step of:
      performing register bank assignment for the plurality of local register files and the at least one global register file;
      performing data replication for paralleling accessing; and
      performing physical register assignment.

2. The method of claim 1, wherein the step of performing register bank assignment comprises a sub-step of:
   allocating a datum to one of the plurality of local register files if it is only accessed by one functional unit.

3. The method of claim 1, wherein the step of performing register bank assignment comprises a sub-step of:
   providing a dedicated global bank to each identified data stream operation; and
   allocating a datum to a global bank if it is accessed by more than one functional unit, wherein the global bank corresponds to the data stream operation to which the allocated datum belongs.

4. The method of claim 1, wherein the step of performing data replication comprises a step of:
   replicating a datum in a data sharing relation from one global bank to another global bank by duplicating instructions if the result of the register bank assignment directs the datum to be at multiple banks.

5. The method of claim 1, further comprising a step of:
   performing instruction scheduling for the program representation; and
   generating an assembly code for the program representation according to the result of the instruction scheduling step.

6. The method of claim 1, wherein the program representation is generated according to a program with intrinsic information including sub-word intrinsic information indicating digital signal processor (DSP) instructions supported by the DSP processor.

7. The method of claim 1, wherein the program representation is generated according to a program with intrinsic information including cluster intrinsic information indicating a corresponding relation between an instruction and the cluster executing the instruction.

8. A compiler for providing intrinsic supports for a digital signal processing (DSP) processor with very long instruction word (VLIW) architectures and distributed register files, the DSP processor comprising a plurality of clusters, each cluster comprising a plurality of functional units, a plurality of local register files connected to one of the plurality of functional units, and at least one global register file, each of the at least one global register files comprising a plurality of global banks connected to one of the plurality of functional units, wherein the compiler executed by a computer is configured to perform the steps of:
   generating a program representation with cluster information on instructions of the DSP processor, wherein the cluster information is provided by a program with cluster intrinsic coding;
   identifying data stream operations indicating parallel instruction sequences applied on different data sets in the program representation;
   identifying data sharing relations indicating data shared by the data stream operations in the program representation;
   identifying data aggregation relations indicating results aggregated from the data stream operations in the program representation; and
   performing register allocation for the DSP processor according to the identified data stream operations, the data sharing relations and the data aggregation relations,
   wherein the step of performing register allocation comprising a sub-step of:
      performing register bank assignment for the plurality of local register files and the at least one global register file;
      performing data replication for paralleling accessing; and
      performing physical register assignment.

9. The compiler of claim 8, wherein the step of performing register bank assignment comprises a sub-step of:
 allocating a datum to one of the plurality of local register files if it is only accessed by one functional unit.

10. The compiler of claim 8, wherein the step of performing register bank assignment comprises the sub-steps of:
 providing a dedicated global bank to each identified data stream operation; and
 allocating a datum to a global bank if it is accessed by more than one functional unit, wherein the global bank corresponds to the data stream operation to which the allocated datum belongs.

11. The compiler of claim 8, wherein the step of performing data replication comprises a step of:
 replicating a datum in a data sharing relation from one global bank to another global bank by duplicating instructions if the result of the register bank assignment directs the datum to be at multiple banks.

12. The compiler of claim 8, further configured to perform the steps of:
 performing instruction scheduling for the program representation; and
 generating an assembly code for the program representation according to the result of the instruction scheduling step.

13. The compiler of claim 8, wherein the program representation is generated according to a program with intrinsic information including sub-word intrinsic information indicating digital signal processor (DSP) instructions supported by the DSP processor.

14. The compiler of claim 13, further comprising a function bank including functions supporting sub-word intrinsic coding.

15. The compiler of claim 8, wherein the program representation is generated according to a program with intrinsic information including cluster intrinsic information indicating a corresponding relation between an instruction and the cluster executing the instruction.

16. The compiler of claim 15, further comprising a function bank including functions supporting cluster intrinsic coding.

* * * * *